United States Patent [19]

Barnes et al.

[11] 4,392,679
[45] Jul. 12, 1983

[54] BEEHIVE CLAMPING AND TRANSFER DEVICE

[76] Inventors: Walter P. Barnes, 671 Hemlock St., Macon, Ga. 31201; Carlo Emilio, Jr., 4070 Atwood Dr., Macon, Ga. 31204

[21] Appl. No.: 263,759

[22] Filed: May 14, 1981

[51] Int. Cl.³ .......................... A01K 51/00; B66C 1/16
[52] U.S. Cl. ........................................ 294/15; 6/12 R; 294/67 R; 294/150
[58] Field of Search .............. 294/15, 74, 67 R, 67 B, 294/67 D, 67 DA, 67 DB, 67 E, 67 EA, 137, 155, 148-151, 161-165; 6/1, 2 R, 6, 8, 12 R, 12 M; 24/16 R, 19; 206/451, 452, 597; 292/258, 288, 289, 292, 293; 410/12, 23, 31, 32, 35, 38-41, 46, 96-100, 120, 156

[56] References Cited

U.S. PATENT DOCUMENTS

| 862,908 | 8/1907 | Hawkinson | 292/258 |
| 977,738 | 12/1910 | Herrick | 6/12 R X |
| 1,644,278 | 10/1927 | Romine | 410/35 |
| 1,920,837 | 8/1933 | Birdsey | 206/452 |
| 2,108,480 | 2/1938 | Foster | 6/12 R X |
| 2,158,067 | 5/1939 | Flanagan | 6/12 R |
| 2,276,768 | 3/1942 | Flanagan | 6/12 R |
| 2,358,431 | 9/1944 | Williams | 294/158 X |

FOREIGN PATENT DOCUMENTS 624935  9/1961  Italy ................................. 410/156

Primary Examiner—Johnny D. Cherry
Attorney, Agent, or Firm—Merriam, Marshall & Bicknell

[57] ABSTRACT

A device for clamping beehive elements together during transit, including a clamp for each of two opposite sides of the beehive. Each clamp includes a U-shaped top hook member with one leg hooked onto the top beehive element and bracing the hive elements, and another leg having an eye for engaging a yoke assembly during lifting. A bottom hook member for each clamp includes a hooking portion under the bottom beehive element and a linear portion bracing the bottom hive elements. An adjustable turnbuckle for each clamp engages a chain linked to the top hook member. The other turnbuckle end is mated to the bottom hook member.

12 Claims, 4 Drawing Figures

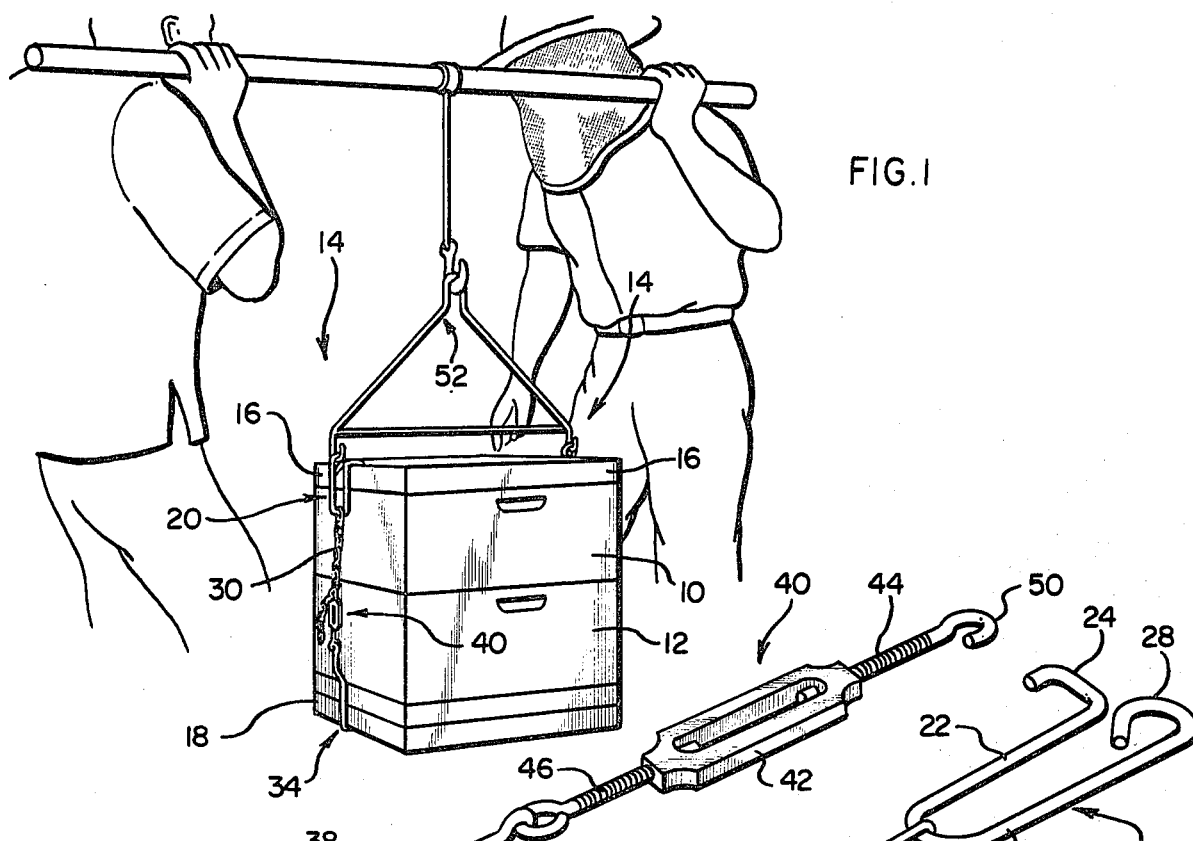
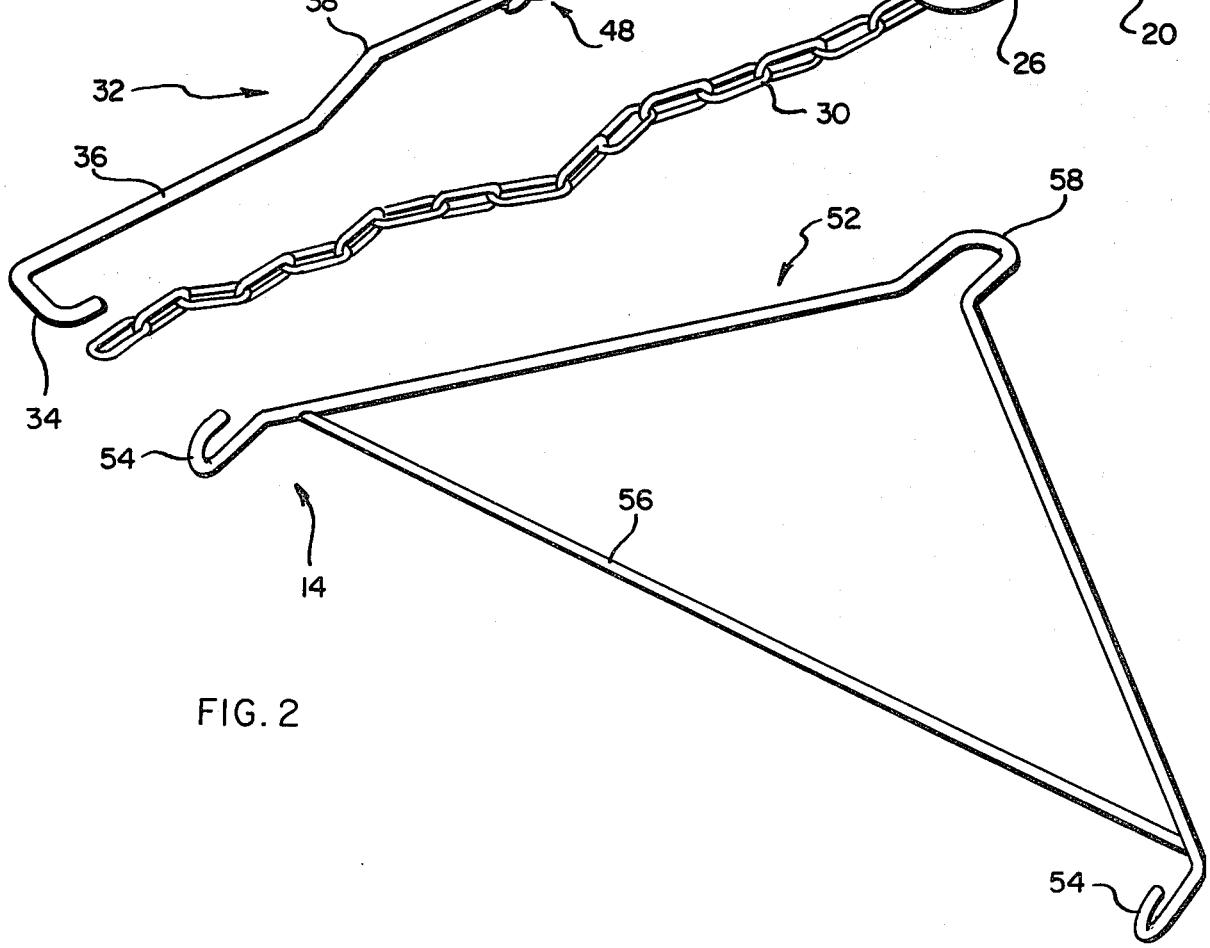

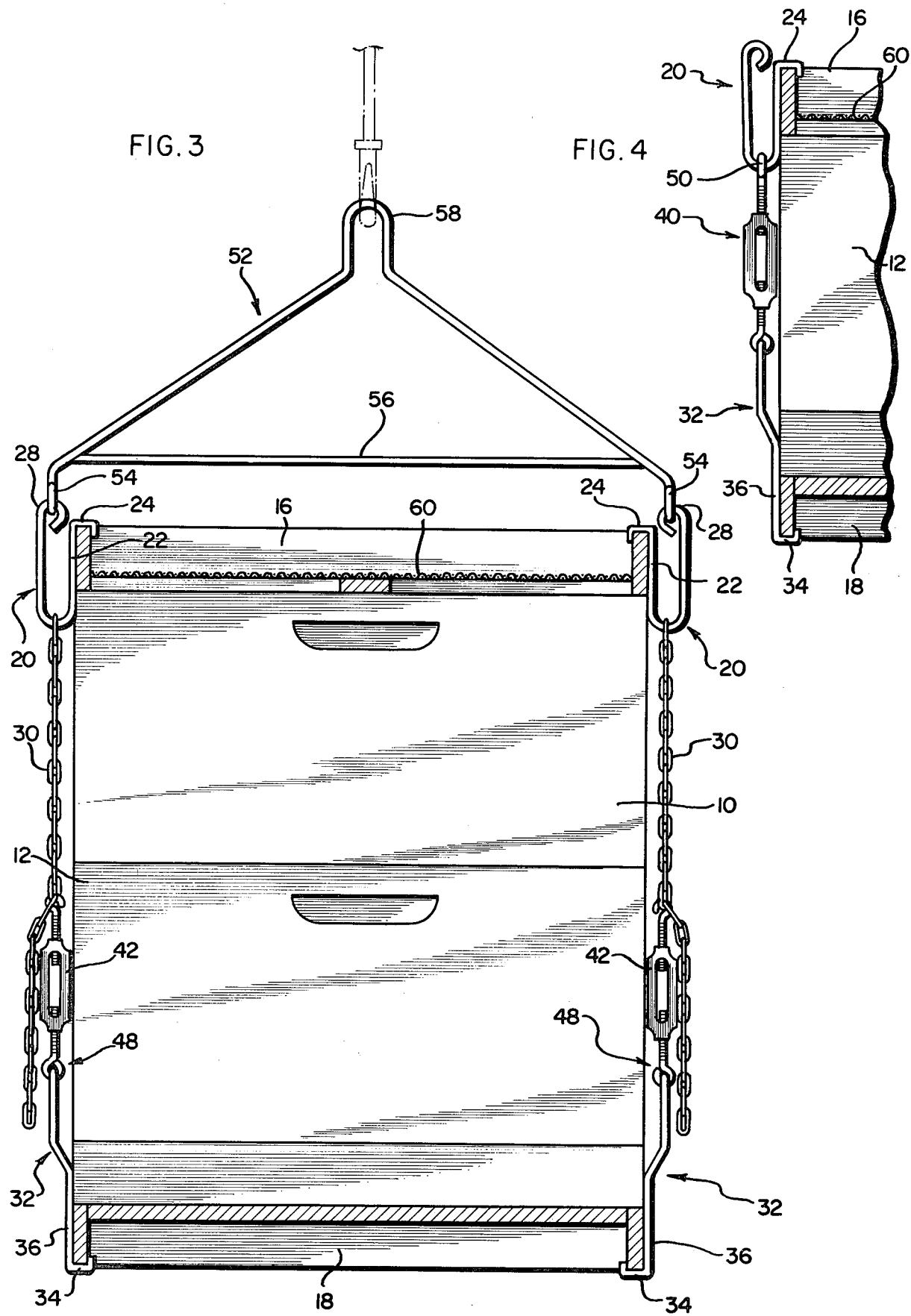

4,392,679

BEEHIVE CLAMPING AND TRANSFER DEVICE

This invention relates to devices for clamping the elements of a beehive together, and more particularly to such devices for enabling the lifting and transporting of beehives.

BACKGROUND OF THE INVENTION

Reference may be made to the following U.S. Pat. of interest: U.S. Pat. Nos. 2,358,431; 2,276,768; and 1,212,190.

A typical beehive includes a hive body, and at least a top and bottom cover board. There may also be included a top screen element, a bottom screen element, or a section commonly known as a "super" hive body. In the practice of migratory beekeeping, transporting of the beehive is required, necessitating clamping of the beehive elements during transfer to prevent relative movement of the hive elements.

The aforementioned U.S. Pat. Nos. 2,358,431, and 2,276,768 illustrate two proposed devices for clamping the beehive elements during transit. In general, such clamping devices require nailing wooden strips or metal staples into the hive elements or utilizing a reinforced tape. These devices tend to deface the beehive elements and promote premature decay. Some of these suggested techniques also are not versatile and thus cannot be used with various combinations of different sized beehive elements. Furthermore, after transfer, some of the suggested techniques prevent or at least inhibit easy manipulation and interchange of beehive elements. In addition, some of the suggested devices require a hammer during installation which leads to undesired upsetting of the bees.

Other devices proposed include internal rods which must be carefully inserted through all of the beehive elements during installation. While the internal rods perform satisfactorily for clamping and transferring, they require extra work and care during application or removal to reduce as much as possible undesired irritation of the bees.

Therefore, it is desired to provide a device which can be readily installed onto and removed from a beehive for clamping a variety of sizes of beehive elements together without relative movement, and which enables the hive to be lifted and moved with safety to the workers as well as to the bees.

SUMMARY OF THE INVENTION

In accordance with the principles of the present invention, there is provided a device for clamping each of at least two respective opposite sides of the beehive elements. A first hook member in each side clamp includes a portion shaped to hook around the top beehive element, while a second hook member in each side clamp includes a portion shaped for hooking under the bottom beehive element. The first hook member is U-shaped and a length of chain may be linked onto the first hook in a first embodiment for relatively high stacks of beehive elements. A turnbuckle in each side clamp interconnects the chain to the top of the second hook member with the turnbuckle being adjustable to securely clamp the beehive elements together. Each top, U-shaped hook member is formed with one leg of the U providing a side brace for the upper hive elements and ending in the hook shaped portion for hooking over the top hive element. The other leg includes a lift mounting portion for receiving a yoke hook during lifting and transporting of the beehive elements.

Each bottom hook member includes a substantially linear portion for extending upwardly adjacent the bottom beehive element when mounted in position, and a bent upper portion which extends upwardly and spaced from the beehive elements. The straight portion provides side bracing contact between the clamping device and the upper beehive elements to aid in preventing undesired relative movement of the hive elements during transporting of the beehive. The bent upper portion and the turnbuckle include complementary mating means for lockingly mating a respective turnbuckle to each of the bottom hooks.

The device is readily attached to one side of the hive elements by placing the bottom hook under the bottom beehive element, placing the top hook over the top beehive element, hooking the free turnbuckle end to a chain link, and adjusting the turnbuckle to decrease the length of the clamping device and thus pulling the elements of the hive tightly together. A similar clamping device and operation is performed on the opposite side of the beehive and final adjustments can then be made to equalize the pressure on both sides of the hive. The hook may then be engaged with the top hooks and the hive transported safely.

A second embodiment is provided for shorter stacks of hive elements. In this case, the chain may be eliminated on each side and the turnbuckle free end is hooked directly onto the U-shaped top hook member.

BRIEF DESCRIPTION OF THE DRAWINGS

The features of this invention which are believed to be novel are set forth with particularity in the appended claims. The invention, together with its object and the advantages thereof, may be best understood by reference to the following description taken in conjunction with the accompanying drawings, in which like reference numerals identify like elements in the several figures and in which:

FIG. 1 is a perspective view illustrating a beehive being transported with the aid of a clamping device in accordance with the present invention in position on respective opposite sides of the beehive;

FIG. 2 is a perspective view illustrating the components of a clamping device positioned on each of two respective opposite sides of the beehive and also illustrating a yoke formed to aid in lifting and transporting the clamped beehive;

FIG. 3 is an elevational view showing the clamping device of FIG. 2 on each side of two hive bodies and a yoke in place for transporting the hive bodies; and FIG. 4 is a fragmented elevational view showing another embodiment of the invention useful for transporting a short beehive stack such as the illustrated single hive body so that the chain can be eliminated.

DETAILED DESCRIPTION

FIG. 1 illustrates two beehive workers safely transporting two hive bodies 10 and 12 with a clamping device 14 constructed in accordance with the present invention and installed on each of two respective hive sides. Each clamping device 14 includes a portion hooking over a top beehive element 16 and hooking under a bottom beehive element 18. It is to be understood that instead of two hive bodies, the clamping device of the present invention may also be used with one super hive body and the top and bottom elements.

FIG. 2 illustrates one embodiment of the clamping device of the present invention, with each hive side clamp including a top U-shaped hook member 20 with one leg 22 ending in a hook-shaped portion 24 and another leg 26 ending in a lift mounting portion, such as eye 28. For use in clamping most of the available sizes and combinations of hive elements, there is included a chain 30, which may be eliminated in situations where the stack of hive body elements are relatively short as illustrated in FIG. 4. A bottom hooking member 32 includes a hooked shaped portion 34, a straight or rectilinear portion 36, and a bent upper portion 38. A turnbuckle 40 includes a central body member 42 threadably engaged with an upper threaded screw 44 and a lower threaded screw 46. Lower threaded screw 46 and bent portion 38 include a complementary mating means 48 such as the illustrated coupled hook and eye for lockingly engaging and thereby mating a turnbuckle with a bottom hooking member. Threaded screw member 44 includes a top portion 50 for normally engaging a link of chain 30 or alternatively engaging the top U-shaped hooking member in the case of a short beehive stack.

A yoke 52 utilized in lifting and transporting the beehive includes respective yoke hooks 54 for engaging a respective one of the lift mounting portions 28 on each top hook member 20. A cross brace 56 serves to reinforce the yoke. An upper yoke eye 58 may then be engaged by a lift bar and a suitable lift hook for transporting the hive as shown in FIG. 1. Alternatively, rather than the yoke 52, any other suitable lifting member such as a rod or chain may be suitably adapted to engage the respective lift mounting portions 28 on each opposite side of the beehive. It is preferred however, that a yoke assembly, such as a yoke 52 be utilized for lifting and transferring the beehive since the illustrated yoke is particularly adapted with hooks 54 for readily engaging respective top hooks 20.

FIG. 3 illustrates a clamping device in accordance with the present invention installed on opposite sides of the stack of beehive elements. The beehive elements are securely clamped in position with the preferred lifting member comprising yoke 52 engaging the top hook of each clamping device. As noted in FIG. 3, straight portion 36 is formed as an extension of hooking portion 34 so as to extend upwardly adjacent bottom beehive element 18 and thereby brace each side thereof. Also, leg 22 is formed as a brace and extends from hooking portion 24 downwardly adjacent top beehive element 16. These portions of the top and bottom hooks therefore act as side braces and respectively cooperate to securely brace the beehive elements and prevent relative transverse or sideways movement between them during hive transit.

FIG. 4 illustrates another embodiment of the invention for use with short stacks of beehive element containing for instance top element 16, bottom element 18, and one beehive body 12. In this embodiment, the chain can be eliminated and instead the hooking portion 50 of turnbuckle 40 hooks directly onto the U-shaped legs of upper hooking member 20.

In preparation for transferring the hive body, the hive is first prepared by placing framed top screens on the hive after the hive top cover is removed. As an example, a screen 60 is illustrated in place in top element 16 in FIG. 3. The bottom hook 32 and mated turnbuckle 40 are then placed in position with hooking portion 34 installed under the center edge of the bottom hive element. Hooking portion 24 of the top hook 20 is then placed in hooking position over top hive element 16, and hooking portion 50 of turnbuckle 40 is engaged with an appropriate link of chain 30 with the chain allowed to hang freely and the turnbuckle initially extended to near its maximum length. Turnbuckle body 42 is then adjusted to decrease the length of the clamp and until the hive elements are drawn tightly together. The same installing procedure is utilized on the opposite side of the hive. Final adjustments are then made to both turnbuckles to insure equal tension, pressure and clamping tightness on both sides of the hive. In addition to top screen 60, a corresponding bottom screen may be utilized on the hive to afford adequate air circulation throughout the hive while in transit. A simple screen over the entrance may also be used.

Accordingly, this invention is especially adaptable for a beekeeper having a relatively small number of hives and cannot afford the automated apparatus available to large sized beekeeper operations. The invention thus provides the clamping, lifting and transporting of beehives safely and with ease, and is particularly adapted to such usage since the elements of a beehive are of different measurements and height. In addition, the clamping device of the present invention may be installed and removed without physically altering the hive elements and with a minimum disturbance of the bees within the hive.

The foregoing detailed description has been given for clearness of understanding only, and no unnecessary limitations should be understood therefrom, as modifications will be obvious to those skilled in the art.

What is claimed is:

1. A device for securely maintaining beehive elements together during transit, including top and bottom elements with a hive body element therebetween, comprising:
    a clamp for each of at least two respective opposite sides of the beehive, each clamp including;
    a pair of hooks for respectively hooking onto the top and bottom beehive elements;
    a chain connected to one of the hooks; and
    a turnbuckle interconnecting the chain to the other hook,
    the turnbuckle of each clamp being adjustable to securely clamp the beehive elements together and prevent relative movement therebetween; and
    said hooks respectively hooking onto the top beehive element on each clamped side include a lift mounting portion engageable with lift means for lifting said beehive elements during transit thereof.

2. A device according to claim 1, wherein said lift mounting portion includes an eye portion formed at the end of said hooks.

3. A device according to claim 2, wherein said lift means includes a yoke having respective yoke hooks for engaging respective eye portions.

4. A device for securely maintaining beehive elements together during transit, including top and bottom elements with a hive body element therebetween, comprising:
    a clamp for each of at least two respective opposite sides of the beehive, each clamp including;
    a pair of hooks for respectively hooking onto the top and bottom beehive elements;
    a chain connected to one of the hooks; and
    a turnbuckle interconnecting the chain to the other hook, the turnbuckle of each clamp being adjustable to securely clamp the beehive elements together and prevent relative movement therebetween;

said hooks respectively hooking onto the bottom beehive elements on each clamped side include a substantially linear bottom brace portion for extending upwardly adjacent the bottom beehive element, and a bent upper portion for extending upwardly spaced from the beehive elements, said linear bottom brace portion providing side braces to prevent undesired sideways movement of said hive elements during transit.

5. A device according to claim 4, wherein the bent upper portions of each of the hooks, and each of the turnbuckles, includes mating means for lockingly mating a respective turnbuckle end to one of said hooks.

6. A device according to claim 5, wherein said hooks respectively hooking onto the top beehive element on each clamped side are U-shaped with one leg formed as a top brace portion extending downwardly adjacent the top beehive element and the other leg extending upwardly spaced from the beehive elements, said top brace portions providing side braces to prevent undesired sideways movement of said hive elements during transit.

7. A device according to claim 6, including lift means for engaging each of said other legs of respective U-shaped hooks during transit of said beehive elements.

8. A device according to claim 7, wherein a respective chain is engageable between the U-shaped hook and the turnbuckle.

9. A device according to claim 8, wherein the free other end of each of said turnbuckles include a hooking portion for engaging a respective chain.

10. A device for securely maintaining a plurality of stacked beehive elements together during transit comprising:

a clamp for each of at least two respective opposite sides of the beehive, each clamp including;

top and bottom hook members, including a hook portion for respectively hooking onto the top and bottom beehive elements in said stack;

said top hook member being U-shaped and including lift engaging means on one leg of said U-shape adapted for engaging lift means for lifting said beehive elements during transit, and the other leg extending downwardly from said respective hook portion and adjacent the top beehive element to brace and prevent lateral movement of the top portion of said beehive elements during transit;

said bottom hook members including a substantially linear portion extending upwardly from said respective hook portion and adjacent the bottom beehive element to brace and prevent lateral movement of the bottom portion of said beehive elements during transit, and further including a bent portion extending upwardly from said linear portion and spaced from said beehive elements; and a turnbuckle having opposite ends respectively engaging said U-shaped top hook member and the bent portion of said bottom hook member, the turnbuckle of each clamp being adjustable to securely clamp the beehive elements together.

11. A device according to claim 10, including means for securely mating one end of each turnbuckle with the bent portion of said bottom hook member, and means for detachably engaging the free other end of each turnbuckle with said U-shaped top hook member.

12. A device according to claim 11, including a chain insertable between each top hook member and the free end of each turnbuckle to lengthen each clamp, and adapted for use with higher stacks of beehive elements.

* * * * *